United States Patent [19]

Toms et al.

[11] Patent Number: 5,263,168
[45] Date of Patent: Nov. 16, 1993

[54] CIRCUITRY FOR AUTOMATICALLY ENTERING AND TERMINATING AN INITIALIZATION MODE IN A DATA PROCESSING SYSTEM IN RESPONSE TO A CONTROL SIGNAL

[75] Inventors: Thomas R. Toms; Joseph Jelemensky; Hubert G. Carson, Jr.; Mark R. Heene, all of Austin, Tex.

[73] Assignee: Motorola, Inc., Schaumburg, Ill.

[21] Appl. No.: 709,552

[22] Filed: Jun. 3, 1991

[51] Int. Cl.⁵ .......................... G06F 9/00; G06F 12/00
[52] U.S. Cl. ............................. 395/700; 364/264; 364/281.3; 364/282.1
[58] Field of Search ................ 395/425, 250, 275, 200, 395/525, 700, 650

[56] References Cited

U.S. PATENT DOCUMENTS

| | | | |
|---|---|---|---|
| 4,044,337 | 8/1977 | Hicks et al. | 395/250 |
| 4,354,225 | 10/1982 | Frieder et al. | 395/275 |
| 4,470,127 | 9/1984 | Thompson | 395/575 |
| 4,516,199 | 5/1985 | Frieder et al. | 395/275 |
| 4,527,237 | 7/1985 | Frieder et al. | 395/200 |
| 4,805,093 | 2/1989 | Ward | 395/425 |

*Primary Examiner*—Kevin A. Kriess
*Assistant Examiner*—Kevin Spivak
*Attorney, Agent, or Firm*—Elizabeth A. Apperley

[57] ABSTRACT

A data processing system (10), comprised of a central processing unit (14) and a memory system (16), has an efficient initialization operation. The memory system (16) provides a bus interface unit (20) to automatically determine whether the system (10) should execute an initialization operation or function in a normal mode of operation. The memory system (16) begins execution of the initialization operation of the system (10) in response to both a logic value of a reset signal and a value of an address transferred by an address bus. The memory system (16) automatically terminates execution of the initialization operation in response to the value of the address transferred by the address bus.

18 Claims, 5 Drawing Sheets

CIRCUITRY FOR AUTOMATICALLY ENTERING AND TERMINATING AN INITIALIZATION MODE IN A DATA PROCESSING SYSTEM IN RESPONSE TO A CONTROL SIGNAL

FIELD OF THE INVENTION

This invention relates generally to an initialization operation in a data processing system.

BACKGROUND OF THE INVENTION

When a data processing system is first powered up or is reset, the data processing system must execute a predetermined set of steps necessary to initialize the system to operate correctly. The predetermined set of steps provides a plurality of data processing instructions which initialize predetermined functions and addresses vital to the proper operation of the system. For example, a program counter and an address location might be initialized during execution of the predetermined set of steps. The program counter is typically used to indicate a starting address of a software program which initializes the data processing system to function in a predetermined manner. As well, the address location may be used to indicate where a first entry of a system stack should be stored. The system stack provides a storage location for information values used while a software data processing instruction is executed. While the data processing system is executing the predetermined set of steps to initialize vital functions, the system is generally said to be operating in "boot mode."

In a known implementation, a dedicated device executes the predetermined set of steps when a data processing system is in boot mode. The dedicated device is located in the same address space as a plurality of reset vectors. The plurality of reset vectors are used to reset the data processing system through either a software program or a logic circuit. Therefore, when the data processing system is reset, the dedicated device is accessed and a plurality of information and data processing software instructions associated with the dedicated device are executed. The information and data processing software instructions initialize the data processing system during boot mode operation and enable the data processing system to execute a predetermined set of steps.

Typically, the dedicated device is implemented in the data processing system either internally or externally, and is either a memory system or a logic circuit. If the dedicated device is implemented internally within the data processing system, a portion of the system is, therefore, dedicated for use only while the data processing system is in boot mode. Consequently, a portion of the data processing system which could otherwise enhance the functionality and performance of the system must be reserved for system initialization.

If the dedicated device is implemented externally as either the memory system or the logic portion, the overhead cost of the data processing system is significantly increased. Therefore, if a dedicated device is required to execute the predetermined set of steps when a data processing system is in boot mode, the user of the system must compromise between achieving maximum system performance and lowering the overhead cost of the system. Additionally, when the dedicated device is located in the same address space as the reset vectors, the user of the system must develop a data processing software program to enable the data processing system to operate in boot mode as well as to move the logical location of the dedicated device from the address space of the reset vectors at a predetermined point in time. Because the user of the data processing system must implement a software program to control the operation of the dedicated device, the system becomes more difficult to use. Therefore, to the user, the performance of the system is degraded during the initialization process. However, because boot mode operation is necessary during initialization of a data processing system, the user of the system must compromise both the functionality and the performance of the system.

Additionally, the testing required to insure the functionality of the boot mode operation of a data processing system can result in a substantial increase in the overall time necessary to test the entire data processing system. To test the functionality of the boot mode of operation of the data processing system, the system must be configured or programmed to operate in boot mode. As well, the system must be repeatedly reset to operate in boot mode for testing purposes. Since testing time generally corresponds to higher manufacturing costs, the time required to test the functionality of the boot mode of operation results in a higher production cost of the data processing system. Therefore, to implement the boot mode of operation in a data processing system, the cost of the entire system is increased.

Although necessary for proper operation of the data processing system, the boot mode of operation requires both a dedicated device to execute the boot mode of operation and additional test time to verify the functionality of the boot mode of operation. The dedicated device results in a compromise of both the performance and the functionality of the system. As well, the additional test time required to reset and program the data processing system for verification of boot mode operation results in higher manufacturing costs.

SUMMARY OF THE INVENTION

The previously mentioned needs are fulfilled with the present invention. Accordingly, there is provided, in one form, circuitry for automatically entering and terminating an initialization mode in a data processing system in response to a control signal. The circuitry comprises a data processor for receiving a plurality of data processing instructions and executing the instructions by selectively generating addresses and receiving data required to implement the execution of the instructions. The processor has an input for receiving information. The circuitry also comprises a communication bus coupled to the input of the processor for communicating the data processing instructions, the addresses and data, and the control signal. The circuitry also comprises a memory circuit for selectively providing the processor with data. A first storage location of the memory circuit addressed during the initialization mode for providing information to the processor, and a second storage location of the memory circuit is addressed subsequent to the initialization mode for providing information to the processor. Also, the circuitry provides a memory control circuit coupled to the memory circuit and the communication bus, the memory control circuit being integrated on a single integrated circuit with the memory circuit, the memory control circuit receiving addresses from the data processor. At least one address value selectively addresses one of two storage locations and also receives the control signal. The at least one address value and the control signal being collectively used to selectively automatically enable the data processing system to enter the initialization mode, the memory control circuit automatically terminating the initialization mode in response to a predetermined condition within the data processing system being met.

These and other features, and advantages, will be more clearly understood from the following detailed description taken in conjunction with the accompanying drawings.

DETAILED DESCRIPTION OF A PREFERRED EMBODIMENT

When a data processing system is first powered up or is reset, the data processing system must execute a predetermined set of steps necessary to initialize the system to operate correctly. The predetermined set of steps typically initializes a plurality of internal registers such as a program counter and a stack pointer from a respective one of a plurality of specified addresses referred to as "bootstrap addresses." While the data processing system is executing the predetermined set of steps, the system is said to be operating in boot mode.

Typically, when the data processing system is operating in boot mode, either a dedicated memory space referred to as "boot memory" or a logic circuit is required to respond to each respective one of the plurality of bootstrap addresses with information necessary to initialize both the program counter and the stack pointer. For example, when the boot memory is accessed by the bootstrap addresses, a data processing software program stored therein is subsequently executed to initialize both the program counter and the stack pointer. Similarly, a logic circuit may be enabled when one of the plurality of bootstrap addresses is provided by the data processing system. The logic circuit manipulates each one of the plurality of bootstrap addresses to provide the correct control and information signals to initialize both the program counter and stack pointer.

Each time one of the plurality of bootstrap addresses is provided by the data processing system and when the system is reset, either the boot memory or the logic circuit executes the predetermined set of steps to initialize the system. Therefore, the bootstrap addresses are assigned, or memory mapped, to the boot memory or the logic circuit, and may not be used for any other purpose. In cases in which the boot memory is stored in a significant portion of a memory array, the user of the system must initialize the data processing system and consequently compromise full access of the memory array. Similarly, if the predetermined set of steps to initialize the data processing system are complex, the corresponding logic circuitry may be equally complicated and require a significant portion of the system area.

Often, the boot memory or the logic circuit is assigned to another set of addresses after the data processing system is initialized. Therefore, during normal data processing operations, the boot memory and the logic circuit may be used for another purpose. However, an assignment logic circuit must be implemented to assign the boot memory or the logic circuitry to the other set of addresses after the data processing system is no longer operating in boot mode. If either the boot memory or the logic circuit is implemented, both the functionality and the performance of the data processing system are diminished.

The invention described herein provides a data processing system in which a memory system integrated within the system provides an efficient initialization process during boot mode operation without an additional memory space or logic circuitry in a central processing unit (CPU). The memory system controls the initialization process internally, and does not access the CPU during boot mode operation. When the data processing system is initialized, the memory system automatically terminates the boot mode of operation. Subsequent accesses to the address locations corresponding to the bootstrap addresses are decoded by the memory system to access a different memory location. Therefore, the data processing system is not required to reserve a portion of the CPU for either a memory storage portion or a logic circuit portion to execute a plurality of steps necessary to initialize the system. Additionally, the memory system allows the user of the system to test the functionality of the boot mode of operation with little added programming or test time.

Figure 1:
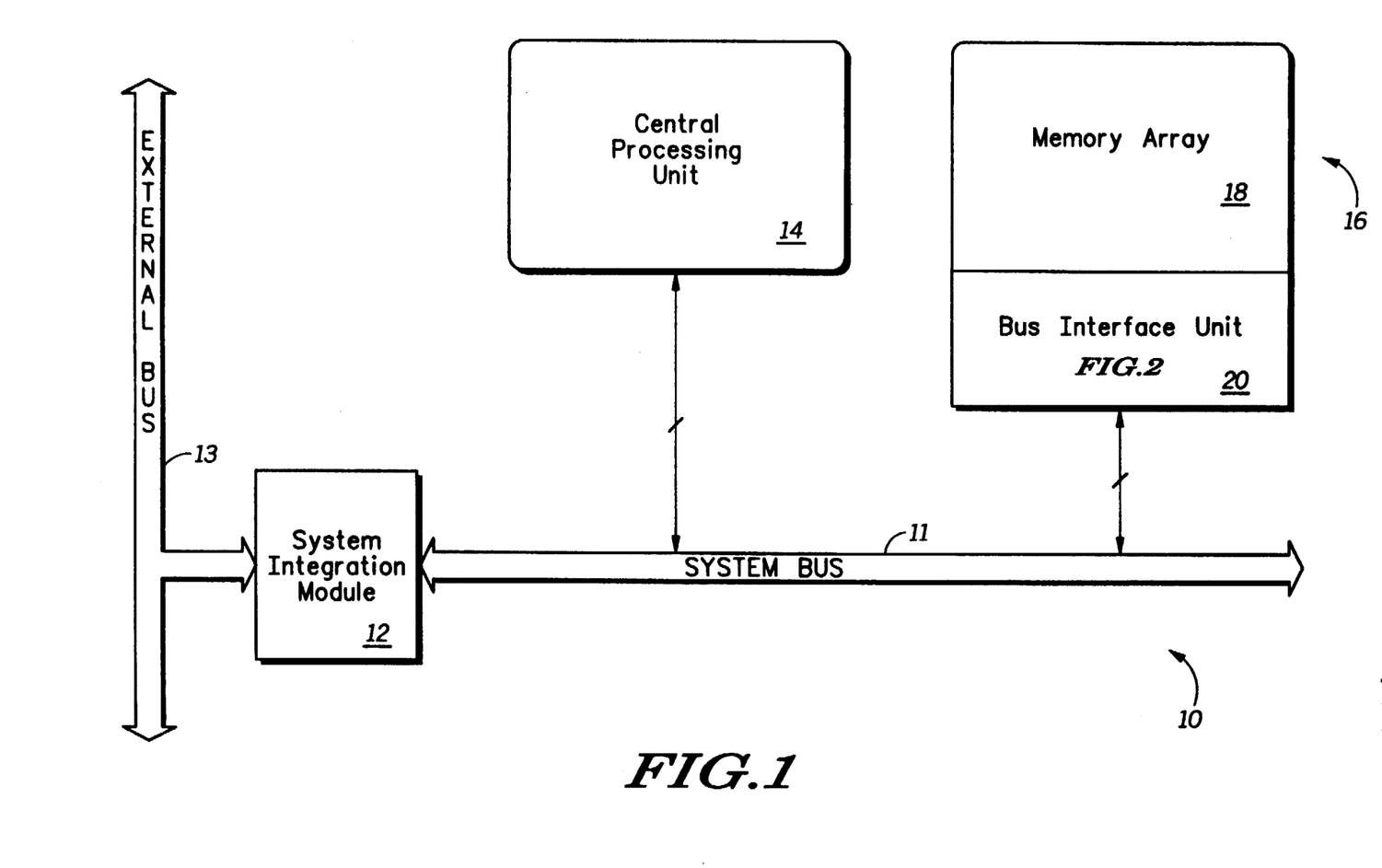
FIG. 1 illustrates in block diagram form a data processing system in accordance with the present invention.

Illustrated in FIG. 1 is a data processing system 10 having an efficient initialization routine as described above. The data processing system 10 is generally comprised of a system integration module 12, a central processing unit (CPU) 14, and a memory system 16. The memory system 16 is comprised of a memory array 18 and a bus interface unit 20.

During operation, the user of the data processing system provides a plurality of control and information signals to the system integration module 12 via a bus 13 labelled "External Bus." Subsequently, the system integration module 12 controls the transfer of control and information signals to and from both the CPU 14 and the memory system 16 via a bidirectional bus 11 labelled "System Bus."

The control and information signals provide a plurality of inputs to CPU 14. The CPU 14 interprets and manipulates the system control and information signals to execute a plurality of data processing software instructions specified by the user of the system 10. The control and information signals also provide a plurality of inputs to memory system 16. Depending on the mode of operation, the memory system 16 provides either information stored at the bootstrap addresses or data information to the user of the system 10.

In the memory system 16, the bus interface unit 20 receives and manipulates control and information signals from the System Bus 11. The bus interface unit 20 determines whether bootstrap information or data values should be accessed from the memory array 18. For example, if the data processing system 10 is operating in boot mode, the bus interface unit 20 provides an address of an initialization software program. Additionally, if the user of the system 10 is operating in a normal mode, a data information value stored in the memory array 18 is accessed.

Assume the data processing system 10 is initialized to a known state immediately after the system 10 is reset. A reset signal is transferred to the CPU 14 and the memory system 16 via the System Bus 11. The reset signal indicates that the data processing system 10 should either stop current operations and be initialized to a known state, be initialized after being powered up, or be tested by the user of the system 10.

After receiving the reset signal, the data processing system 10 retrieves a plurality of bootstrap addresses from the memory system 16 to correctly initialize all portions of the system. When the last one of the plurality of bootstrap addresses is retrieved, the memory system 16 automatically terminates the boot mode of operation and no longer responds to the bootstrap addresses. Instead, a plurality of other logic portions and devices (not shown) are assigned to the bootstrap addresses when boot mode is terminated.

Figure 2:
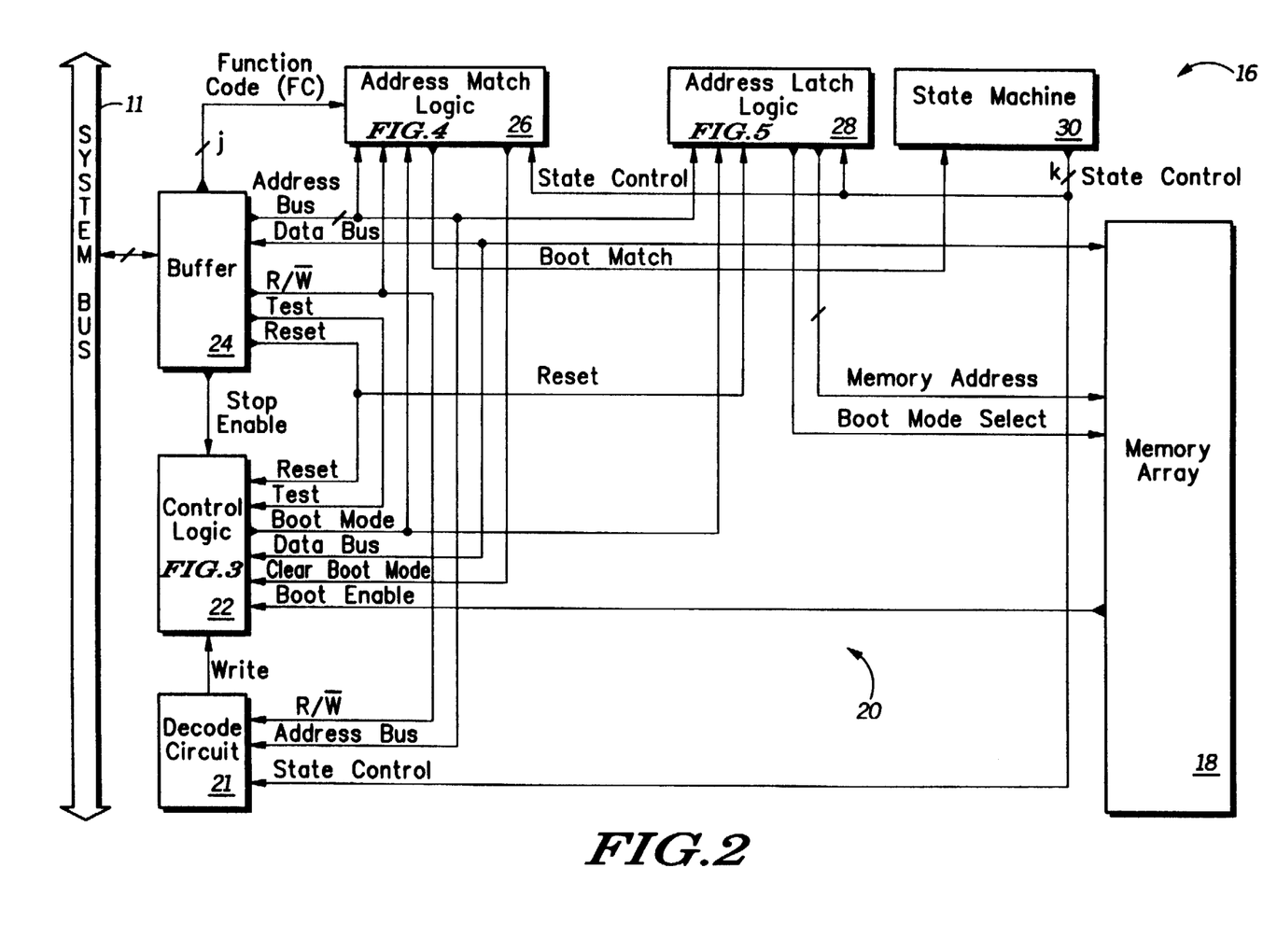
FIG. 2 illustrates in block diagram form a memory system as illustrated in FIG. 1.

The memory system 16, comprised of the memory array 18 and the bus interface unit 20, is illustrated in FIG. 2. The memory array 18 is implemented as a standard conventional array of memory elements such as a read only memory (ROM), a random access memory (RAM), an electrically erasable programmable ROM (EEPROM), or a flash EEPROM. Assume in this example that the memory array 18 is implemented as a flash EEPROM (not shown in detail). The flash EEPROM is electrically erasable and programmable, and emulates a ROM memory.

The bus interface unit 20 is generally comprised of a decode circuit 21, a control logic circuit 22, a buffer 24, an address match logic circuit 26, an address latch logic circuit 28, and a state machine 30.

The System Bus 11 provides a plurality of control and information signals to the buffer 24. The buffer 24 temporarily stores the control and information signals, strengthens the magnitude of each signal, and then provides each signal to a corresponding portion of either the bus interface unit 20 or the memory array 18. The buffer 24 provides bidirectional transfers of control and information signals from the user of the system 10 both to and from the bus interface unit 20 and the memory array 18 via the System Bus 11.

The plurality of information signals received by the buffer 24 include a multi-bit address bus signal and a multi-bit data bus signal. The address bus signal transfers address information to a remaining portion of the bus interface unit 20 and the memory array 18. Likewise, the data bus signal also transfers data information to the remaining portion of the bus interface unit 20 and the memory array 18.

The data bus signal is transferred to the buffer 24 via the System Bus 11. The data bus signal transfers data used during operation of the memory system 16 and is connected to a plurality of data inputs of both the control logic circuit 22 and the memory array 18.

Similarly, the address bus signal is transferred to the buffer 24 by the System Bus 11. The address bus transfers address information during operation of the memory system 16. The address bus signal is connected to a plurality of address inputs of the address match logic circuit 26, the decode circuit 21, and the address latch logic circuit 28.

The buffer 24 also receives a plurality of control signals. A first one of the plurality of control signals is a signal labelled "Stop Enable." When the Stop Enable signal is asserted with a logic high value, memory system 16 may be disabled to allow the user of the data processing system 10 to utilize another type of memory device. The Stop Enable signal provides a stop enable control input to control logic circuit 22.

A second one of the plurality of control signals provided by the buffer 24 is a signal labelled "Reset." The Reset signal indicates that the data processing system 10 should be initialized. The Reset signal may be asserted at the time the system 10 is first powered up or by a user if the system 10 should be initialized to a known state. The Reset signal provides a reset input to both control logic circuit 22 and address latch logic circuit 28.

A third one of the plurality of controls is labelled "Test." The Test signal is asserted with a logic high value when a test operation is executed by the user of the data processing system 10. The test operation performs a test of the data processing system 10 to insure the functionality of a predetermined portion of the components comprising system 10. In this example, the Test signal allows the system 10 to be placed in boot operation so that the functionality of circuitry associated with controlling boot mode operation may be tested. The Test signal provides a test control input to control logic circuit 22.

The buffer 24 provides a fourth one of the plurality of control signals labelled "R/$\overline{\text{W}}$." The R/$\overline{\text{W}}$ (Read/Write) signal provides control information to identify whether the data processing system 10 is reading an information value from or writing an information value to a predetermined address storage location in the memory array 18. The R/$\overline{\text{W}}$ signal provides a read/write control input to both decode circuit 21 and address match logic circuit 26.

The buffer 24 also provides a fifth one of the plurality of control signals labelled "Function Code." The Function Code signal is comprised of a plurality of j bits, where j is an integer. The plurality of j bits indicates an area of the data processing system 10 to be accessed. For example, assume in this example, that a portion of the memory array 18 may be specified to reside in either a Supervisor space or a User space. If the portion of the memory array 18 resides in Supervisor space, access to the portion is restricted to a supervisor of the system 10 only. Otherwise, the portion of the memory array 18 resides in User space and may be accessed by both the supervisor and a user of the system 10. Assume in this example that j equals three and, therefore, that the Function Code signals provide three function code control inputs to the address match logic circuit 26.

The state machine 30 provides a plurality of k state control signals, where k is an integer, to control the operation of the bus interface unit 20. The plurality of state control signals are provided in response to a signal labelled "Boot Match." The Boot Match signal is provided as an output of the address match logic circuit 26 to indicate that the memory system 16 should operate in boot mode.

The state machine 30 provides one of the plurality of state control signals labelled "Clock" (not shown in FIG. 2) to a first state control input of address match circuit 26 and a state control input of decode circuit 21. The Clock signal provides a clock signal to enable the boot mode of operation in the data processing system 10. The decode circuit 21 provides a first output signal labelled "Write" to a write control input of control logic 22. The Write signal is respectively provided as a control input of control logic 22 to enable a write operation of the memory system 16. A second state control input of the address match logic circuit 26 is labelled "Latch Control" (not shown in FIG. 2) and is also provided by the state machine 30.

Similarly, the state machine 30 provides a first and a second state control input to the address latch logic circuit 28 to indicate whether a bootstrap address or a normal address should be accessed. The first and second state control inputs are respectively labelled "Address Latch" and "Address Latch" (not shown in FIG. 2).

The address match logic circuit 26 provides a control input labelled "Clear Boot Mode" to the control logic circuit 22. The Clear Boot Mode signal indicates when memory system 16 should terminate the boot mode of operation.

The memory array 18 provides a signal labelled "Boot Enable" to a boot mode enable input of the control logic circuit 22 in response to a predetermined address provided by the address latch logic circuit 28. The Boot Enable signal indicates whether the memory array 18 is operating as a bootstrap memory or as a normal memory device at a predetermined base address to the memory system 16. If the Boot Enable signal is a logic high value, the data processing system 10 operates in boot mode and responds to the bootstrap addresses after the system 10 has been reset. The Boot Enable signal provides a boot enable control input to control logic circuit 22.

Figure 3:
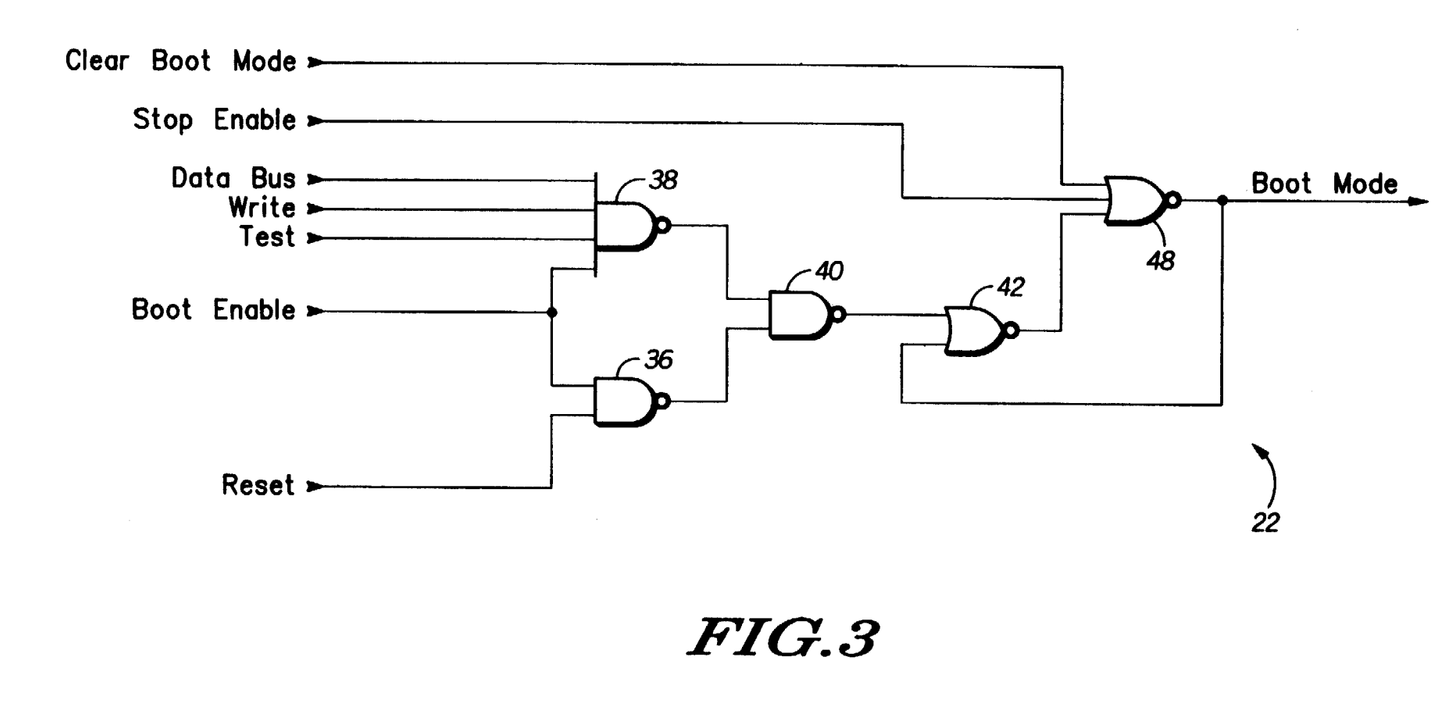
FIG. 3 illustrates in logic diagram form a control logic circuit as illustrated in FIG. 2.

The control logic circuit 22 is illustrated in greater detail in FIG. 3. The control logic circuit 22 is generally comprised of a NAND gate 36, a NAND gate 38, a NAND gate 40, a NOR gate 42, and a NOR gate 48.

The Reset signal provides a first input to NAND gate 36 and the Boot Enable signal provides a second input to NAND gate 36 and a first input to NAND gate 38. The Test signal and the Write signals respectively provide a second and a third input to NAND gate 38. A predetermined bit of the data bus provides a fourth input to NAND gate 38.

An output of NAND gate 36 and an output of NAND gate 38 respectively provide a first and second input NAND gate 40. An output of NAND gate 40 provides a first input to NOR gate 42. An output of NOR gate 42 provides a first input to NOR gate 48. The Stop Enable signal provides a second input to NOR gate 48. The Clear Boot Mode signal provides a third input to NOR gate 48.

An output of NOR gate 48 provides a signal labelled "Boot Mode." The Boot Mode signal provides a second input to NOR gate 42 and a boot mode control input to both the address match logic circuit 26 and the address latch logic circuit 28. The Boot Mode signal indicates whether or not the memory system 16 is operating in boot mode.

To assert the Boot Mode signal with a logic high value, the inputs of the control logic circuit 22 must satisfy several conditions. For example, if the data processing system 10 is being initialized, both the Reset and the Boot Enable signals should be asserted with a logic high value. Subsequently, the output of NAND gate 36 is a logic low value. If either the Reset signal or the Boot Enable signal is not asserted and has a logic low value, the output of NAND gate 36 is a logic high value.

The Boot Mode signal is also asserted when the boot mode of operation is tested by the user of the data processing system 10. If either the Boot Enable, Test, Write, or Data In signals have a logic low value, the output of the NAND gate 38 is a logic high value. However, when each of the Boot Enable, Test, Write, and Data In signals has a logic high value, the output of NAND gate 38 is a logic low value.

If either of the outputs of NAND gate 36 or NAND gate 38 is a logic low value, the output of NAND gate 40 is a logic high value. Similarly, if both of the outputs of NAND gate 36 and NAND gate 38 have a logic high value, the output of NAND gate 40 is a logic low value.

If the output of NAND gate 40 is a logic low value, the output of NOR gate 42 is dependent on the output of NOR gate 48. However, if the output of NAND gate 40 is a logic high value, the output of NOR gate 42 is a logic low value. The output of NOR gate 42 provides the first input to NOR gate 48.

The Stop Enable signal provides the second input to NOR gate 48. Similarly, the Clear Boot Mode signal provides a third input to NOR gate 48.

If the output of NOR gate 42, the Stop Enable signal, and the Clear Boot Mode signal all have a logic low value, the output of NOR gate 48, the Boot Mode signal, is a logic high value. The output of NOR gate 48 provides the second input to NOR gate 42. Therefore, the Boot Mode signal remains at a logic high value until either the Clear Boot Mode signal or the Stop Enable sigal is asserted with a logic high value.

However, if any one of the inputs to NOR gate 48 has a logic high value, the output of NOR gate 48 is a logic low value. The output of NOR gate 48 provides the second input to NOR gate 42 as feedback information.

For the Boot Mode signal to be asserted with a logic high value, several conditions must exist. For example, neither the Stop Enable or Clear Boot Mode signals may be asserted with a logic high value. Therefore, the memory system 16 must not be in stop mode and an address on the address bus must be one of the plurality of bootstrap addresses of the memory system 16.

Additionally, either the data processing system 10 must be reset and initialized, or boot mode operation of the system 10 must be tested by the user of the system 10. If the data processing system 10 is reset and initialized, both the Reset and Boot Enable signals are asserted with a logic high value. If the data processing system 10 is tested by the user of the system 10, the Boot Enable, Test, Write, and Data In signals all have a logic high value. In either case, the output of NAND gate 40 is a logic high value. Therefore, the output of NOR gate 42 is a logic low value and the Boot Mode signal is subsequently asserted with a logic high value.

The Boot Mode signal provides a boot mode input to both the address match logic circuit 26 and the address latch logic circuit 28. The address match logic circuit 26 indicates whether the memory system 16 should operate in boot mode or in a normal mode, and is illustrated in greater detail in FIG. 4.

Figure 4:
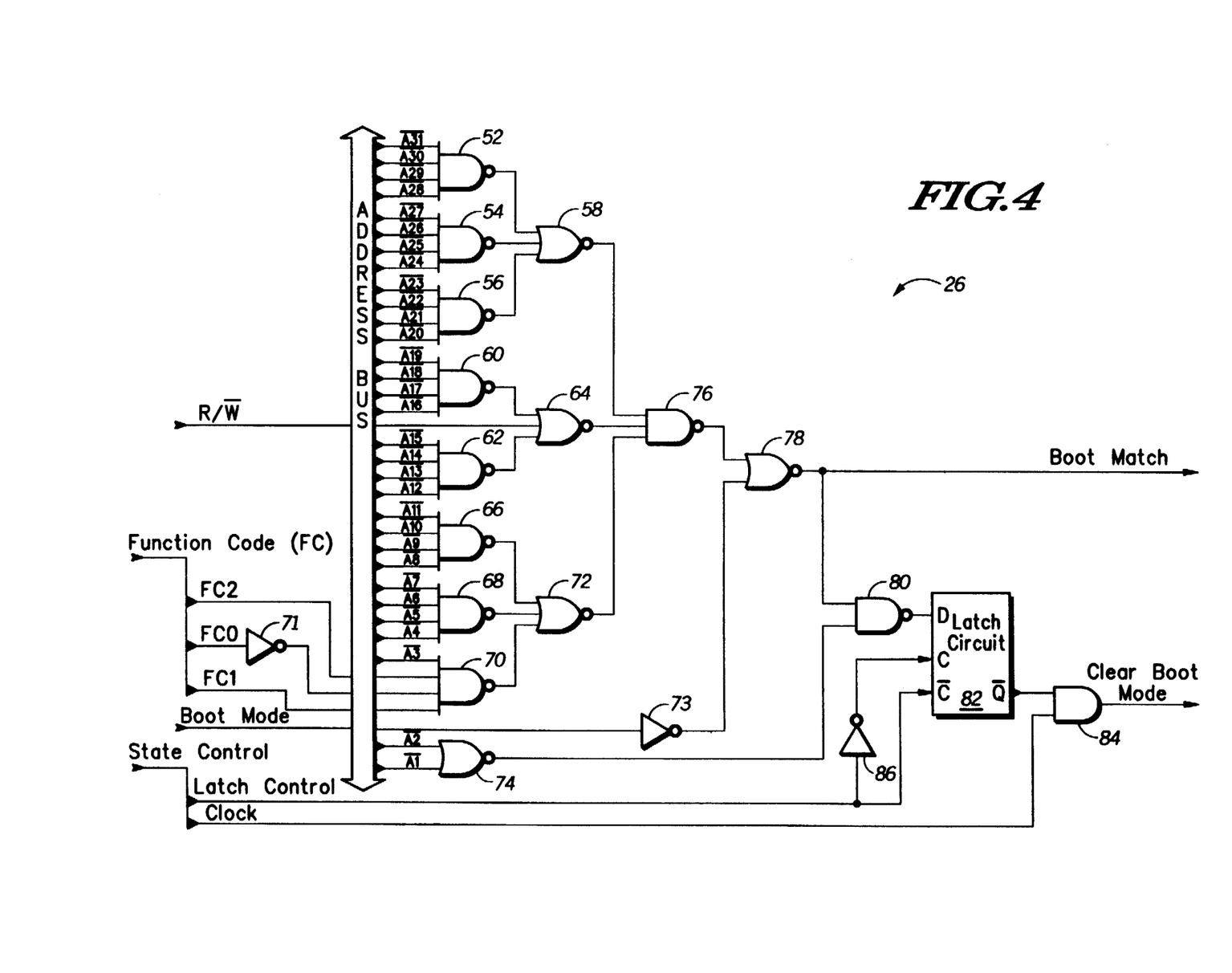
FIG. 4 illustrates in partial logic diagram form an address match logic circuit as shown in FIG. 2.

The address match logic circuit 26 is generally comprised of a NAND gate 52, a NAND gate 54, a NAND gate 56, a NOR gate 58, a NAND gate 60, a NAND gate 62, a NOR gate 64, a NAND gate 66, a NAND gate 68, a NAND gate 70, an inverter 71, a NOR gate 72, an inverter 73, a NOR gate 74, a NAND gate 76, a NOR gate 78, a NAND gate 80, a latch circuit 82, a AND gate 84, and an inverter 86.

The address bus provides a plurality of n inputs to each one of the plurality of NAND gates 52, 54, 56, 60, 62, 66, 68, 70, and NOR gate 74, where n is an integer which reflects the bit width of the address bus. Assume in this example that n equals thirty-two. An inverse value of a high order bit of an address transferred via the address bus is labelled "$\overline{A31}$" and an inverse value of a low order bit of the address is labelled "$\overline{A1}$." All bits of the address are similarly labelled. For example, an inverse value of bit ten of the address is labelled "$\overline{A10}$."

The address bus provides address bits $\overline{A31}$, $\overline{A30}$, $\overline{A29}$, and $\overline{A28}$ to first, second, third, and fourth inputs of NAND gate 52 respectively. Bits $\overline{A27}$, $\overline{A26}$, $\overline{A25}$, and $\overline{A24}$ are respectively transferred to first, second, third, and fourth inputs of NAND gate 54 via the address bus. Similarly, bits $\overline{A23}$, $\overline{A22}$, $\overline{A21}$, and $\overline{A20}$ are respectively transferred to first, second, third, and fourth inputs of NAND gate 56, and bits $\overline{A19}$, $\overline{A18}$, $\overline{A17}$, and $\overline{A16}$ are respectively transferred to first second, third, and fourth inputs of NAND gate 60. Additionally, bits $\overline{A15}$, $\overline{A14}$, $\overline{A13}$, and $\overline{A12}$ are transferred to first, second, third, and fourth inputs of NAND gate 62 respectively, and bits $\overline{A11}$, $\overline{A10}$, $\overline{A9}$, and $\overline{A8}$ are respectively transferred to first, second, third, and fourth inputs of NAND gate 66. Also, bits $\overline{A7}$, $\overline{A6}$, $\overline{A5}$, and $\overline{A4}$ are respectively transferred to first, second, third, and fourth inputs of NAND gate 68. Bit $\overline{A3}$ is transferred to a first input of NAND gate 70, and bits $\overline{A2}$ and $\overline{A1}$ are provided as respective first and second inputs to NOR gate 74. Bit $\overline{A0}$ is not used to determine whether the memory system 16 should implement boot mode operation. Therefore, the logic value of bit $\overline{A0}$ will not effect an output provided by the address match logic circuit 26.

A plurality of j function code control signals are provided by the Function Code signal. In this example, assume that j equals three and the function code control signals are labelled "FC0," "FC1," and "FC2." The plurality of function code control signals provide the plurality of function code control inputs to address match logic circuit 26. The FC0 signal provides an input to inverter 71. An output of inverter 71 provides a second input to NAND gate 70. The FC1 and FC2 signals respectively provide a third and a fourth input to NAND gate 70.

An output of NAND gate 52 provides a first input to NOR gate 58. An output of NAND gate 54 and an output of NAND gate 56 respectively provide a second and third input to NOR gate 58. An output of NOR gate 58 provides a first input to NAND gate 76.

An output of NAND gate 60 provides a first input to NOR gate 64. The R/$\overline{W}$ signal provides a second input to NOR gate 64 and an output of NAND gate 62 provides a third input to NOR gate 64. An output of NOR gate 64 provides a second input to NAND gate 76.

An output of NAND gate 66 provides a first input to NOR gate 72. Additionally, an output of NAND gate 68 and an output of NAND gate 70 provide a second and a third input to NOR gate 72, respectively. An output of NOR gate 72 provides a third input to NAND gate 76.

An output of NAND gate 76 provides a first input to NOR gate 78. The Boot Mode signal provides an input to inverter 73. An output of inverter 73 provides a second input to NOR gate 78. An output of NOR gate 78 is a signal labelled "Boot Match." The Boot Match signal indicates if the addresses transferred by the address bus are one of the plurality of bootstrap addresses.

The Boot Match signal provides a control input to the state machine 30 and a first input to NAND gate 80. An output of NOR gate 74 provides a second input to NAND gate 80. An output of NAND gate 80 provides a data information input to latch circuit 82.

The state machine 30 provides a Latch Control signal and a Clock signal to the address match logic circuit 26. The Latch Control signal provides an input to inverter 86 and an inverse latch control input to latch circuit 82. An output of inverter 86 provides a latch control input to latch circuit 82.

The latch circuit 82 inverts the data information provided by the output of NAND gate 80 and, subsequently provides a first input to AND gate 84. The Clock signal provides a second input to AND gate 84. An output of AND gate 84 is a signal labelled "Clear Boot Mode." The Clear Boot Mode signal provides an input to control logic circuit 22.

If the Reset signal is asserted, the Boot Enable signal has a logic high value and the Stop Enable and Clear Boot Mode signals have a logic low value, the memory system 16 provides the information necessary to operate the data processing system 10 in boot mode. Assume in this example that the necessary information values are stored in hexadecimal bootstrap address locations $00000000 through $00000006. The information values are stored in bootstrap address locations in byte form. The memory system 16 automatically terminates boot mode operation when hexadecimal bootstrap address $00000006 is read. After the hexadecimal address bootstrap $00000006 is read, the memory system 16 responds only to control or array addresses. If the Boot Enable signal is a logic low value, the data processing system 10 is not enabled to operate in boot mode and the memory system 16 provides a different set of address locations which correspond to the normal mode of operation.

The address match circuit 26 determines whether the memory system 16 should be operating in boot mode as a function of both the value of the addresses transferred via the address bus and the respective values of the plurality of control signals. If the transferred addresses are within the bootstrap address range and the memory system 16 has been reset or the boot mode of operation is being tested by the user of the data processing system 10, the memory system 16 should operate in boot mode. If any one of the conditions listed above is not true, however, the memory system 16 does not operate in boot mode.

Assume that the Reset signal of the memory system 16 has been asserted with a high logic value and a hexadecimal address $00000000 is transferred to the plurality of address inputs of the address match logic circuit 26. Also assume that the Stop Enable and Clear Boot Mode signals are not enabled. Subsequently, control logic circuit 22 provides a Boot Mode signal with a logic high value. Additionally, the function code code control signals are provided by the user of the data processing system 10 to allow the supervisor program space to be accessed for boot mode operation.

The plurality of function code control signals indicates an area of the data processing system 10 which may be accessed. The plurality of function code control signals is manipulated to allow access to either user program or data space, supervisor program or data space, or CPU space. CPU space is typically used to store a plurality of vectors used by the system 10 during an interrupt processing routine. A table illustrating the application of the plurality of function code control signals is illustrated below:

| FC2 | FC1 | FC0 | CYCLE TIME |
|---|---|---|---|
| 0 | 0 | 0 | (Undefined Reserved) |
| 0 | 0 | 1 | User Data Space |
| 0 | 1 | 0 | User Program Space |
| 0 | 1 | 1 | (Undefined Reserved) |
| 1 | 0 | 0 | (Undefined Reserved) |
| 1 | 0 | 1 | Supervisor Data Space |
| 1 | 1 | 0 | Supervisor Program Space |
| 1 | 1 | 1 | CPU Space |

Therefore, according to the table illustrated above, the FC0 signal has a logic low value, and both the FC1 and the FC2 signals have a logic high values when the data processing system 10 is in boot mode.

The FC1 and FC2 signals each respectively provide a logic high value to the third and fourth inputs of NAND gate 70. The FC0 function code control signal is inverted and also provides a logic high value to the NAND gate 70. Therefore, the output of NAND gate 70 is a logic low value. Subsequently, the output of NOR gate 72 is a logic high value.

The value of each bit of hexadecimal address $00000000 is inverted and subsequently transferred to the plurality of address inputs of address match logic circuit 26. Consequently, the output of each of the plurality of NAND gates 52, 54, 56, 60, 62, 66, 68, and 70 is a logic low values. Therefore, the outputs of NOR gates 58, 64, and 72 are also logic high values. The output of NAND gate 76 provides a low logic value to the first input of NOR gate 78. Assume that the Boot Mode signal provides a logic high value to the input of inverter 73. Subsequently, the output of inverter 73 provides a logic low value to the second input of NOR gate 78. The NOR gate 78 then provides a Boot Match signal with a logic high value to the control input of the state machine 30 and the first input of NAND gate 80.

When the hexadecimal address $00000000 is transferred to the address match logic circuit 26, the $\overline{A2}$ and $\overline{A1}$ bits provide logic high values to the first and second inputs of NOR gate respectively. Therefore, the output of NOR gate 74 is a logic low value and is connected to the second input of NAND gate 80.

The output of NAND gate 80 then provides a logic high value to the data information input of latch circuit 82. The Latch control signal provides both the clock and inverse clock inputs to the latch circuit 82. In response to receipt of the clock and inverse clock inputs, latch circuit 82 inverts the output of NAND gate 80 and provides a logic low value to the first input of AND gate 84.

Therefore, the output of AND gate 84, the Clear Boot Mode signal, is always a logic low value when the output of latch circuit 82 is a logic low value. The Clear Boot Mode signal is subsequently output to the control logic circuit 22 as a logic low value.

As illustrated in the above example, when hexadecimal addresses $00000000 through $00000006 are provided during a reset initialization routine, the data processing system operates in boot mode. The bus interface unit 20 automatically terminates boot mode operation without any additional circuitry or memory space provided by the CPU 14 upon receipt of a predetermined address value. In this example, the bus interface unit 20 automatically terminates boot mode operation when hexadecimal address $00000006 is provided to the address match logic 26.

When hexadecimal address $00000006 is provided by the Address bus, the inverse values of address bits $\overline{A31}$ through $\overline{A3}$ remain identical to the inverse values of address bits of hexadecimal address $00000000. Additionally, the values of the function code signals, FC2, FC1, and FC0, remain the same. Therefore, the output of NAND gate 76 remains a logic low value.

Because the memory system 16 is still in boot mode operation when hexadecimal address $00000006 is accessed, the Boot Mode signal is asserted with a logic high value. Therefore, the output of inverter 73 is a logic low value. Consequently, the output of NOR gate 78, the Boot Match signal, is a logic high value.

The Boot Match signal provides a logic high value to the first input of NAND gate 80. The $\overline{A2}$ and $\overline{A1}$ bits both have logic low values when hexadecimal address $00000006 is accessed. Therefore, the output of NOR gate 74 has a logic high value. The output of NOR gate 74 provides a second input to NAND gate 80.

The output of NAND gate 80 provides a logic low value to the information input of the latch circuit 82. The Latch Control signal is asserted with a logic high value and provides the input to inverter 86 and the inverse latch input of latch circuit 82. The output of inverter 86 provides the latch input to latch circuit 82. The latch circuit 82 inverts the output of NAND gate 80 and provides a logic high value to the first input of AND gate 84. Subsequently, when the Clock signal is a logic high value, the output of AND gate 84, the Clear Boot Mode signal, is a logic high value. When the Clear Boot Mode signal is a logic high value, the memory system 16 automatically terminates boot mode operation.

The Clear Boot Mode signal provides the first input to NOR gate 48 of the control logic circuit 22 illustrated in FIG. 3. When the Clear Boot Mode signal is asserted with a logic high value, the output of NOR gate 48, the Boot Mode signal, has a logic low value. Therefore, the Boot Mode signal is not asserted and disables boot mode operation of the memory system 16.

If a hexadecimal address has a value greater than $00000006, the address match logic circuit 26 does not assert the Boot Match signal. For example, if hexadecimal address $000000FF is asserted, the output of NAND gate 68 is a logic high value. Likewise, the output of NAND gate 70 is also a logic high value because the inverse value of bit $\overline{A3}$ is a logic low value.

If the output of NAND gate 68 is a logic high value, the output of NOR gate 72 is a logic low value. Subsequently, the output of NAND gate 76 is a logic high value and the output of NOR gate 78 is a logic low value. Therefore, if a hexadecimal address has a value greater than the largest of the bootstrap addresses, the Boot Match signal is not asserted.

In another example of the operation of the address match logic circuit 26, assume that the user of the data processing system 10 is testing boot mode operation. Therefore, the Data In, Write, R/$\overline{W}$, Boot Enable and Test signals are all asserted with a logic high value at a predetermined point in an operation of the data processing system 10. The Boot Mode signal is then asserted with a logic high value until either the Clear Boot Mode signal or the Stop Enable signal is asserted with a logic high value. The bootstrap addresses ($00000000 through $00000006) are accessed during the boot mode test.

Like the initialization operation, each bit of the hexadecimal address transferred via the Address Bus is inverted before providing an input to one of the plurality of NAND gates 52, 54, 56, 60, 62, 66, 68, 70, or NOR gate 74.

Therefore, during the test of boot mode operation, the output of each one of the plurality of NAND gates 52, 54, 56, 60, 62, 66, 68, and 70 is a logic low value. The output of NOR gates 58, 64, and 72 is then a logic high value and the output of NAND gate 76 is a logic low value. The first input of NOR gate 78 is a logic low value.

Because the memory system 16 is in boot mode operation, the Boot Mode signal provides a logic high value to the input of inverter 73. The output of inverter 73 provides a logic low value to a second input to NOR gate 78. The output of NOR gate 78 is, therefore, a logic high value and the Boot Match signal is provided to the state machine 30.

The Boot Match signal is also provided to the first input of NAND gate 80. The output of NAND gate 80 is dependent on the value of bits $\overline{A2}$ and $\overline{A1}$ of an address value transferred via the Address Bus. If the address value is less than hexadecimal $00000006, the boot mode of operation may be tested in the memory system 16.

When the address value is less than hexadecimal $00000006, the output of NOR gate 74 is a logic low value. The output of NOR gate 74 provides a second input to NAND gate 80. Therefore, the output of NAND gate 80 provides a logic high value to latch circuit 82. The Latch Control signal provides the clock input to latch circuit 82 and the input to inverter 86. The output of inverter 86 provides the inverse clock input to latch circuit 82. The latch circuit 82 inverts the output of NAND gate 80 and provides a logic low value. Therefore, the Clear Boot Mode signal is not asserted and has a logic low value.

When the address value is equal to hexadecimal $00000006, the Clear Boot Mode signal is asserted with a logic high value. The Clear Boot Mode signal is similarly asserted during the reset and initialization operation.

The Boot Match signal provides the boot match control signal to address latch logic circuit 28. The address latch logic circuit 28 is a specialized latch circuit which stores a predetermined bit of an address value transferred by the address bus. During boot mode operation, the address latch logic circuit 28 modifies the value of the bit to access a first address of a memory storage location which contains information used by the data processing system 10 during initialization. During normal operation, the address latch logic circuit 28 does not modify the value of the bit. Therefore, a second address of a memory storage location is accessed in a normal read or write operation. Other bits of the address value are each stored in a latch device which generally does not modify the value of the bit. The address latch logic circuit 28 is illustrated in greater detail in FIG. 5.

Figure 5:
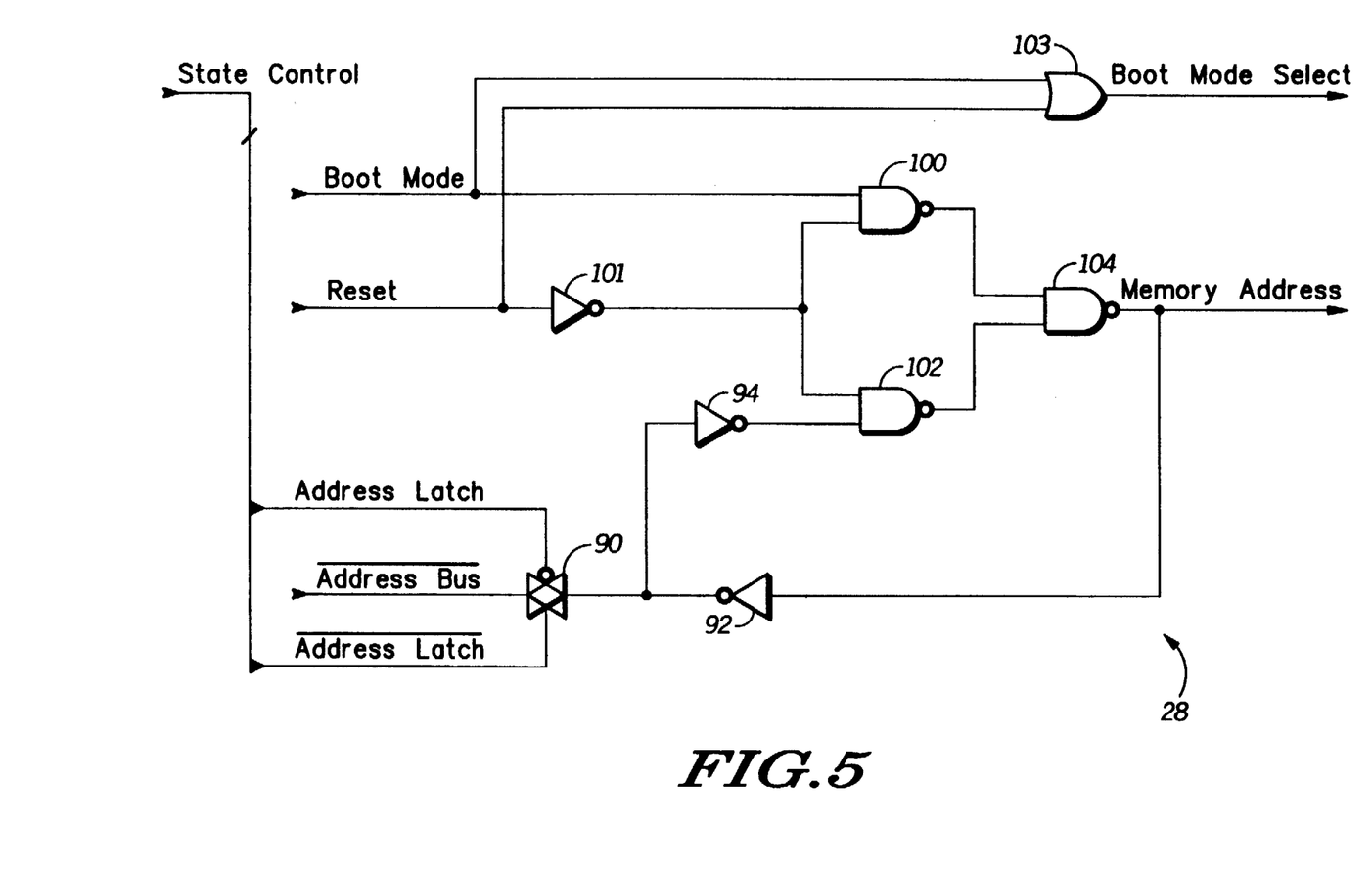
FIG. 5 illustrates in logic diagram form an address latch logic circuit of the system of FIG. 2.

The address latch logic circuit 28 is generally comprised of a transfer gate 90, an inverter 92, an inverter 94, a NAND gate 100, an inverter 101, a NAND gate 102, a OR gate 103, and a NAND gate 104.

The state machine 30 provides an Address Latch and an $\overline{\text{Address Latch}}$ signal to first and second gates of the transfer gate 90 respectively. The Address Bus provides a bit of an inverse address value to an information input of the transfer gate 90. The output of the transfer gate 90 provides an input to inverter 94.

If the $\overline{\text{Address Latch}}$ signal is asserted with a logic high value and the Address Latch signal has a logic low value, transfer gate 90 transfers a bit of the inverse address value to the input of inverter 94. If the Address Latch signal is asserted and has a logic high value, transfer gate 90 does not allow the bit of the inverse address value to transfer to the input of inverter 94.

An output of inverter 94 provides a first input to NAND gate 102. The Reset signal provides an input to inverter 101 and a first input to OR gate 103. An output of inverter 101 provides a second input to NAND gate 102 and a first input to NAND gate 100. The Boot Mode signal provides a second input to both NAND gate 100 and OR gate 103. An output of OR gate 103 provides a signal labelled "Boot Mode Select."

An output of NAND gate 100 is connected to a first input of NAND gate 104 and an output of NAND gate 102 is connected to a second input of NAND gate 104. An output of NAND gate 104 is a signal labelled "Memory Address."

The Boot Mode signal and the Memory Address signal provide control inputs to memory array 18. Memory array 18 decodes both the Boot Mode Select signal and the Memory Address signal to provide either information necessary to enable the boot mode of operation, information necessary to select bootstrap addresses to initiate boot mode operation, or a normal memory information value.

For example, when the Boot Mode Select signal is a logic high value and the Memory Address signal is a logic low value, the memory array 18 provides the Boot Enable signal to the control logic circuit 22. When both the Boot Mode Select signal and the Memory Address signal is a logic high value, the memory array 18 provides the bootstrap addresses necessary to initiate boot mode operation in the data processing system 10. Additionally, when the Boot Mode Select signal is a logic low value, a normal memory information value is provided.

The output of NAND gate 104 provides an input to inverter 92. An output of inverter 92 is connected to the input of inverter 94. The inverter 92 functions to hold the inverse logic value of the output of NAND gate 104 when the transfer gate 90 does not transfer an inverse address bit via the Address Bus.

Normally, if the data processing system 10 is in a normal mode of operation, the Boot Mode signal and the Reset signal both have a logic low value. Therefore, the output of NAND gate 100 is a logic high value and the output of NAND gate 102 depends on a value of an inverse address bit transferred by the address bus.

If the $\overline{\text{Address Latch}}$ signal has been asserted with a logic high value, the value of the inverse address bit is transferred to the input of inverter 94. Assume in this example that the value of the inverse address bit is a logic high value. The output of inverter 94 is, therefore, a logic low value. Consequently, both the output of NAND gate 102 and the output of NAND gate have a logic high value. Subsequently, the output of NAND gate 104 is a logic low value and the Memory Address signal accurately reflects the value of the address bit before being inverted. Therefore, if the data processing system 10 is not operating in boot mode, the Memory Address signal reflects the value of the address bit.

When the data processing system 10 is in the boot mode of operation, the Boot Mode signal has a logic high value and the Reset signal typically has a logic low value. The output of inverter 101 has a logic high value and, therefore, the output of NAND gate 100 is a logic low value. Subsequently, the output of NAND gate 104 is not dependent on the output of NAND gate 102, and the Memory Address signal is always asserted with a logic high value. When the Memory Address signal is a logic high value, the memory array 18 modifies the predetermined bit of the address value to initialize the data processing system 10 during boot mode operation.

There has been provided herein, a data processing system 10 having an efficient initialization operation in response to a control signal. When the data processing system 10 is reset and initialized, the system 10 operates in boot mode. The termination of the boot mode operation is determined and performed by the bus interface unit 20. The user of the system 10 is no longer required to provide added logic circuitry in the CPU 14 to determine when the boot mode of operation should be terminated. Additionally, the bootstrap addresses are located in the reset vector space only during boot mode operation. The circuitry in the bus interface unit 20 of system 10 automatically moves the bootstrap addresses to another memory location when boot mode operation is ceased. The initialization operation implemented herein provides one implementation of an unique and efficient method to initialize the system 10.

However, the user of the data processing system 10 is not restricted to utilizing the initialization operation described herein. The user may determine that an external initialization operation is more useful in a particular application. In such a case, the user would assert the Stop Enable signal in the memory system 16, and the memory system is disabled and would not be able to participate in the initialization operation. Additionally, the user of the system 10 may specify that the memory array 18 provide the Boot Enable signal with a logic low value during the initialization operation. Therefore, although the data processing system 10 does not access bootstrap vectors from the memory system 16, the memory system 16 is not disabled. By allowing the user of the data processing system 10 to determine when the memory system 16 should automatically initiate and terminate the boot mode operation in the system 10, the system 10 provides greater flexibility.

The data processing system 10 also allows the user of the system 10 to test the circuitry necessary to implement boot mode operation in an extremely efficient manner. By placing the system 10 in a special test mode, the boot mode circuitry and corresponding bootstrap addresses may be functionally tested in a much shorter amount of time. If the system 10 could not be placed in the special test mode, boot mode operation functionality tests would required that a data processing system be programmed to perform boot mode operation, reset, and then tested. In tests which require multiple executions of boot mode operation, the time necessary to reset the device requires a substantial amount of tester time. As well, if the data processing system is not initialized correctly to enable boot mode operation, an excessive amount of time is required for programming. In systems in which a software programmable memory array is implemented, even more time was required because the memory array had to be erased before it could be programmed. As the time required to test the data processing system increases, the overall manufacturing cost also increases. Therefore, by allowing the system 10 to test the boot mode circuitry and corresponding bootstrap addresses without resetting or programming, the amount of time necessary to test the system 10 is shortened. Consequently, the manufacturing cost of the data processing system 10 is decreased.

It should be well understood that the data processing system described herein provides an effective and unique solution to initialize a data processing system in response to a control signal. However, the implementation of the invention described herein is provided by way of example only. Many other implementations may exist for executing the function described herein. For example, a system integration module 12 is not necessary. Conceivably, the external bus 13 might be coupled directly to the CPU 14 and the memory system 16. Additionally, the memory array 18 might be implemented as any form of memory. For example, memory array 18 might be implemented as a ROM, EEPROM, flash EEPROM, EPROM or RAM. The bus interface unit 20 may also be implemented in a wide variety of circuit combinations. For example, several of the logic circuits might be combined or implemented with a different logic configuration. The decode circuit 21 might be combined with the control logic circuit 22, and the state machine 30 may be implemented internally within any one of the logic circuits. The logic circuit configurations of control logic circuit 22, address match logic 26, and address latch logic circuit 28 are provided by way of example only and should not be limited to these configurations. In particular, the address latch logic circuit 28 is configured in this implementation of the invention to properly reflect arbitrarily chosen bootstrap addresses. The purpose of the Function Code signal may also be arbitrarily chosen. The Function Code signal discussed in the preferred embodiment of the invention is provided by way of example only. Additionally, although the Boot Enable signal is provided by the memory array 18 in the preferred embodiment of the invention, it could also be provided by a user of the data processing system 10. For example, the Boot Enable signal might be generated by the user of the system 10 and provided to the bus interface unit 20 via the system bus 11. Similarly, the Stop Enable signal might be provided by the memory array 18 rather than the user of the system 10.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

What is claimed is:

1. A data processing system, comprising:
  a data processor for receiving a plurality of data processing instructions and executing the data processing instructions by selectively generating addresses and receiving data required to implement the execution of the data processing instructions, the data processor having an input for receiving information;
  a communication bus coupled to the input of the processor for communicating the data processing instructions, the addresses and data, and a control signal, the control signal enabling the data processing system to operate in an initialization mode;
  a memory means for selectively providing the processor with data, a first storage location being addressed during the initialization mode for providing information to the processor, and a second storage location being addressed subsequent to the initialization mode for providing information to the processor; and a memory control means coupled to the memory means and the communication bus, the memory control means being integrated on a single integrated circuit with the memory means, the memory control means receiving addresses from the data processor, at least one address value selectively addressing one of two storage locations and also receiving the control signal, the at least one address value and the control signal being collectively used to selectively automatically enable the data processing system to operate in the initialization mode, the memory control means automatically terminating operation of the data processing system in the initialization mode in response to a predetermined condition within the data processing system being met.

2. The data processing system of claim 1 wherein the memory control means selectively enables the data processing system to enter the initialization mode in response to both the control signal being asserted and each of the addresses transferred by the communication bus having a value within a predetermined range of address values.

3. The data processing system of claim 1 wherein the memory control means further comprises:

a test means having a first input for receiving a test mode signal provided by a user of the data processing system, the test means providing an enable signal to automatically enter and terminate the initialization mode in response to the test mode signal being asserted.

4. The data processing system of claim 1 wherein the memory control means further comprise:

means coupled to the communication bus for prematurely terminating the initialization mode in response to a stop mode signal provided by a user of the data processing system.

5. The data processing system of claim 1 wherein the memory means may be programmed by a user of the data processing system to selectively provide an initialization mode enable signal to permit the memory control means to selectively prevent the data processing system from entering the initialization mode of operation when the memory control means receives the control signal.

6. The data processing system of claim 1 wherein the memory control means is further comprised of:

a control logic circuit coupled to the communication bus, the control logic circuit receiving the control signal and providing a first initialization signal in response thereto, the first initialization signal enabling the memory control means to access the first storage location of the memory means during the initialization mode of operation;

an address match circuit coupled to the control logic circuit for receiving the first initialization signal, the address match circuit also being coupled to the communication bus for receiving the at least one address value, the address match circuit comparing the at least one address value to determine whether the at least one address value is within a predetermined range of address values and providing a second control signal in response thereto;

a state machine coupled to the address match circuit and the control logic circuit, the state machine receiving the second control signal and enabling the control logic circuit to continue providing the first initialization signal; and address latch logic means coupled to the control logic circuit, the state machine and the memory means, the address latch logic means providing the at least one address value in a predetermined logic state to the memory means in response to the first initialization signal and the state machine.

7. The data processing system of claim 6 wherein the address latch logic means accesses the first storage location of the memory means when the at least one address value is in the predetermined logic state, and the address latch logic means accesses the second storage location of the memory means when the at least one address value is not in the predetermined logic state.

8. The data processing system of claim 1 wherein the memory means is a flash electrically erasable programmable read only memory (EEPROM), the flash EEPROM being randomly accessible.

9. The data processing system of claim 1 wherein the control signal is a reset signal, the reset signal provided by a user of the data processing system.

10. A data processing system, comprising:

a data processor for receiving a plurality of data processing instructions and executing the data processing instructions by selectively generating addresses and receiving data required to implement the execution of the data processing instructions, the data processor having an input for receiving information;

a communication bus coupled to the input of the processor for communicating the data processing instructions, the addresses and data, and a control signal, the control signal enabling the circuit to operate in an initialization mode;

a memory array for selectively providing the processor with data and initialization mode control information, an initialization mode enable signal being provided to enable the processor to enter the initialization mode in response to receipt of a predetermined address signal, a first storage location being addressed during the initialization mode for providing information to the data processor, and a second storage location being addressed subsequent to the initialization mode for providing information to the data processor; and a memory interface means coupled to the memory array and the communication bus, the memory interface means being integrated on a single integrated circuit with the memory array, the memory interface means receiving addresses from the data processor, at least one address value selectively addressing one of two storage locations, the memory interface means receiving the initialization mode enable signal from the memory array and also receiving the control signal from the data processor, the at least one address value, the initialization mode enable signal, and the control signal being collectively used to selectively automatically enable the data processing system to enter the initialization mode, the memory interface means automatically terminating the initialization mode in response to a predetermined condition within the data processing system being met.

11. The data processing system of claim 10 wherein the memory interface means further comprises:

a control logic circuit coupled to the communication bus and the memory array, the control logic circuit receiving the control signal from the communication bus and the initialization mode signal from the memory array, and providing a first initialization signal in response thereto, the first initialization signal enabling the memory interface means to access the first storage location of the memory array during the initialization mode of operation;

an address match circuit coupled to the control logic circuit for receiving the first initialization signal, the address match circuit also being coupled to the communication bus for receiving the at least one address value, the address match circuit comparing the at least one address value to determine whether the at least one address value is within a predetermined range of address values and providing a second control signal in response thereto;

a state machine coupled to the address match circuit and the control logic circuit, the state machine receiving the second control signal and enabling the control logic circuit to continue the initialization operation; and address latch logic means coupled to the control logic circuit, the state machine and the memory array, the address latch logic means providing the at least one address value in a predetermined logic state to the memory array in response to the first initialization signal and the state machine.

12. The data processing system of claim 11 wherein the address latch logic means accesses the first storage location of the memory array when the at least one address value is in the predetermined range of addresses, and the address latch logic means accesses the second storage location of the memory array when the at least one address value is not within the predetermined range of addresses.

13. The a data processing system of claim 10 wherein the memory interface means further comprises: a test means having a first input for receiving a test mode signal provided by a user of the data processing system, the test means providing an enable signal to automatically enter and terminate the initialization mode in response to the test mode signal being asserted.

14. The data processing of claim 10 wherein the control signal is a reset signal, the reset signal provided by an external user.

15. A data processing system, comprising:
a data processor for receiving a plurality of data processing instructions and executing the data processing instructions by selectively generating addresses and receiving data required to implement the execution of the data processing instructions, the data processor having an input for receiving information;

a communication bus coupled to the input of the processor for communicating the data processing instructions, the addresses and data, and a control signal, the control signal enabling the data processing system to operate in an initialization mode;

a memory means for selectively providing the processor with data, a first storage location being addressed during the initialization mode for providing information to the processor, and a second storage location being addressed subsequent to the initialization mode for providing information to the processor; and a memory control means coupled to the memory means and the communication bus, the memory control means being integrated on a single integrated circuit with the memory means, the memory control means receiving addresses from the data processor, at least one address value selectively addressing one of two storage locations and also receiving the control signal, the at least one address value and the control signal being collectively used to selectively automatically enable the data processing system to operate in the initialization mode, the memory control means automatically terminating operation of the data processing system in the initialization mode in response to a predetermined condition within the data processing system being met, wherein the memory control means comprises:

a control logic circuit coupled to the communication bus, the control logic circuit receiving the control signal and providing a first initialization signal in response thereto, the first initialization signal enabling the memory control means to access the first storage location of the memory means during the initialization mode of operation;

an address match circuit coupled to the control logic circuit for receiving the first initialization signal, the address match circuit also being coupled to the communication bus for receiving the at least one address value, the address match circuit comparing the at least one address value to determine whether the at least one address value is within a predetermined range of address values and providing a second control signal in response thereto;

a state machine coupled to the address match circuit and the control logic circuit, the state machine receiving the second control signal and enabling the control logic circuit to continue providing the first initialization signal; and address latch logic means coupled to the control logic circuit, the state machine and the memory means, the address latch logic means providing the at least one address value in a predetermined logic state to the memory means in response to the first initialization signal and the state machine.

16. A data processing system, comprising:
a data processor for receiving a plurality of data processing instructions and executing the data processing instructions by selectively generating addresses and receiving data required to implement the execution of the data processing instructions, the data processor having an input for receiving information;

a communication bus coupled to the input of the processor for communicating the data processing instructions, the addresses and data, and a control signal, the control signal enabling the circuit to operate in an initialization mode;

a memory array for selectively providing the processor with data and initialization mode control information, an initialization mode enable signal being provided to enable the processor to enter the initialization mode in response to receipt of a predetermined address signal, a first storage location being addressed during the initialization mode for providing information to the data processor, and a second storage location being addressed subsequent to the initialization mode for providing information to the data processor;

a control logic circuit coupled to the communication bus and the memory array, the control logic circuit receiving the control signal from the communication bus and the initialization mode signal from the memory array, and providing a first initialization signal in response thereto, the first initialization signal enabling the memory interface means to access the first storage location of the memory array during the initialization mode of operation;

an address match circuit coupled to the control logic circuit for receiving the first initialization signal, the address match circuit also being coupled to the communication bus for receiving the at least one address value, the address match circuit comparing the at least one address value to determine whether the at least one address value is within a predetermined range of address values and providing a second control signal in response thereto;

a state machine coupled to the address match circuit and the control logic circuit, the state machine receiving the second control signal and enabling the control logic circuit to continue the initialization operation; and address latch logic means coupled to the control logic circuit, the state machine and the memory array, the address latch logic means providing the at least one address value in a predetermined logic state to the memory array in response to the first initialization signal and the state machine.

17. A method for initializing a data processing system, wherein the data processing system performs the steps of:

providing a first initialization signal to a data processing system;

providing an address value to a memory array in the data processing system, the address value selectively addressing one of two storage locations in a memory array;

determining whether the address value is in a predetermined range of addresses;

asserting a first control signal to indicate that the address value is in the predetermined range of addresses and negating the first control signal to indicate that the address value is not within the predetermined range of addresses;

selectively modifying the address value in response to a value of the first control signal and the first initialization signal to provide a modified address value;

using the modified address value to access a first one of the two storage locations in the memory array when the first initialization signal is asserted; and using the modified address value to access a second one of the two storage locations in the memory array when the first initialization signal is asserted.

18. The method of claim 17, wherein the data processing system performs the step of:

programming the memory array to provide an initialization mode enable signal to selectively enable the data processing system to enter an initialization mode of operation; and selectively asserting the initialization mode enable signal in response to a logic state of the first control signal.

* * * * *